Figure 1:
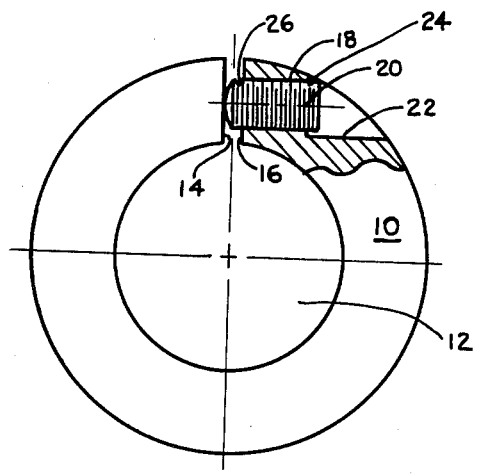
Figure 2:
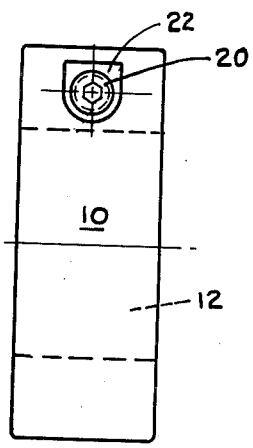
Figure 3:
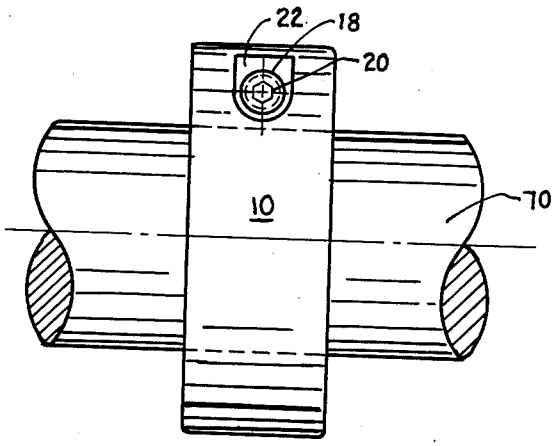
Figure 4:
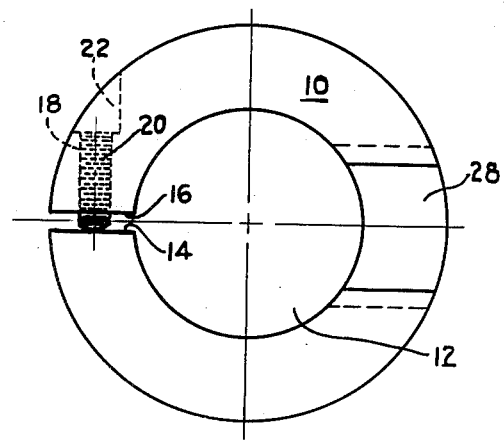
Figure 5:
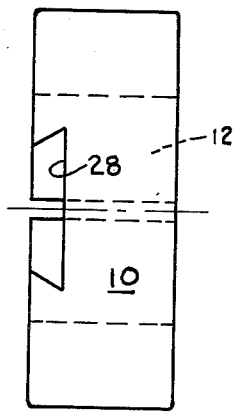
Figure 6:
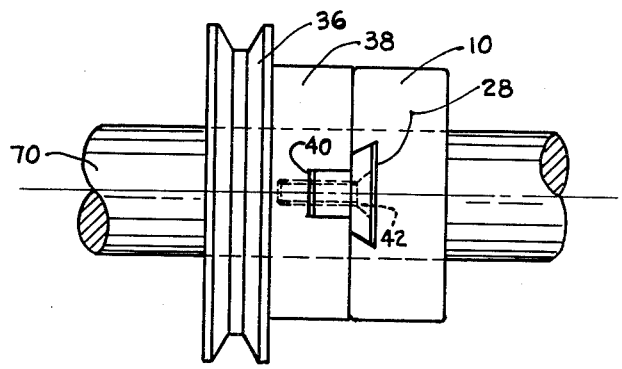
Figure 7:
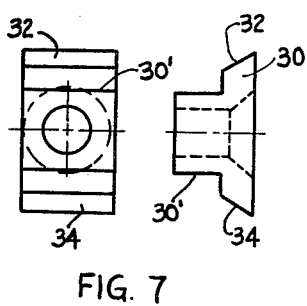

July 3, 1962 R. F. KOEN 3,042,433
SHAFT GRIPPING ELEMENT
Filed Oct. 26, 1959 3 Sheets-Sheet 1

INVENTOR.
RICHARD F. KOEN

BY *Wesley Everett*

July 3, 1962  R. F. KOEN  3,042,433
SHAFT GRIPPING ELEMENT
Filed Oct. 26, 1959  3 Sheets-Sheet 2

INVENTOR.
RICHARD F. KOEN
BY

July 3, 1962 R. F. KOEN 3,042,433
SHAFT GRIPPING ELEMENT
Filed Oct. 26, 1959 3 Sheets-Sheet 3
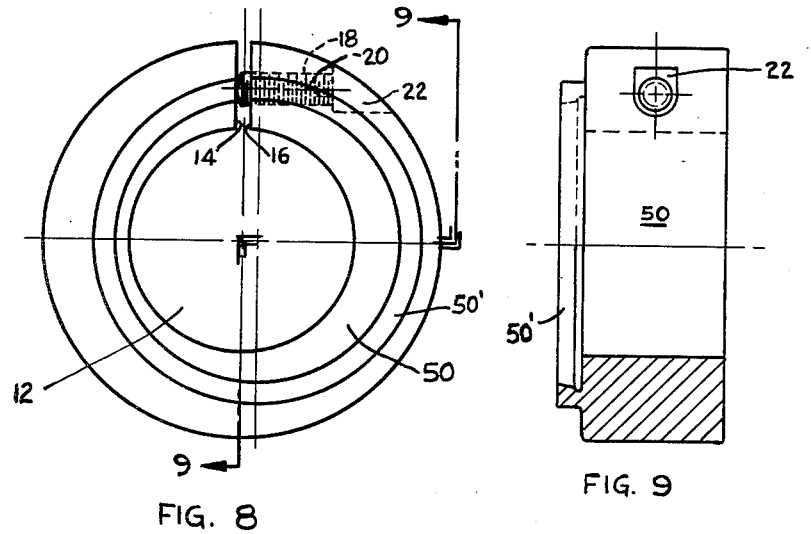
FIG. 8
FIG. 9
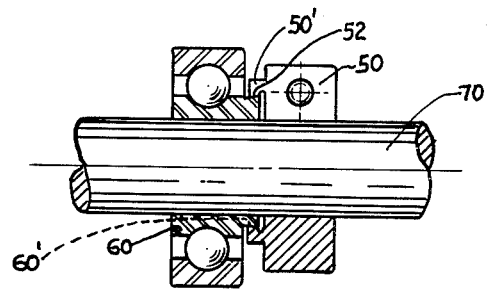
FIG. 10
INVENTOR.
RICHARD F. KOEN
BY United States Patent Office 3,042,433
Patented July 3, 1962

3,042,433
SHAFT GRIPPING ELEMENT
Richard F. Koen, P.O. Box 200, Lutherville, Md.
Filed Oct. 26, 1959, Ser. No. 848,747
1 Claim. (Cl. 287—52)

The present invention relates to an improvement in a prestressed shaft gripping element and is particularly desirable for use as a collar and in attaching pulleys, gears, rotary cutting knives, etc. without shaft keyways, to shafts without scoring or scarring the shaft. The gripping element is formed and preset to slide over the shaft upon which it is to be attached and is easily and effectively securable to the shaft without any special tools.

The gripping element may be used as a separate unit for attaching other elements to shafts, or the gripping element may be so constructed as to form a part, or be in combination with the other elements forming a unit to be carried by the shaft.

The primary object of the invention is to provide such a gripping element that is simple and efficient to manufacture and use.

Another object of the invention is to provide such a gripping element that requires no setting or adjusting of the element at the time it is being applied to the shaft.

A further object of the invention is to provide such a gripping element that will not score the shaft and at the same time has the gripping power of a shrink fit without close tolerances and selective fits.

A still further object of the invention is to provide a vibration proof element of this character.

While several objects have been pointed out, other objects, uses and advantages may be more apparent as the nature of the invention is more fully disclosed, which consists in its novel combination, construction, and the arrangement of its several parts shown in the preferred accompanying drawings and described in the following specifications and particularly defined in the appended claim.

In the drawings:

FIGURE I is a side view in elevation of the gripping element.

FIGURE II is an edge view in elevation of the same.

FIGURE III is an edge view similar to FIGURE II showing the gripping element in place on a shaft.

FIGURE IV is a side view in elevation of the gripping element showing one way for attaching an operating element such as a pulley or gear.

FIGURE V is an edge view of the element shown in FIGURE IV.

FIGURE VI is an edge view similar to FIGURE V showing the gripping element attached to an operating element, such as a pulley.

FIGURE VII is a detailed view in elevation, showing one of the many ways for connecting the gripping element with a work element.

FIGURE VIII is a side view in elevation of a modified form of the gripping element.

FIGURE IX is an edge view of the same in elevation.

FIGURE X is a view partly in section and partly in elevation showing the modified form of gripping element associated with a bearing ring.

In referring to the drawings, like numerals are used to designate like and similar parts throughout the several views.

The gripping element primarily is shown in FIGURES I to III inclusive. The gripping element 10 is preferably in the form of an annular ring having a hole 12 extending through its center. The ring is split along a line parallel with a plane passing through the axis of the gripping element about which it is adapted to rotate, leaving two adjacent abutting faces 14 and 16.

In one of the faces (16) is a threaded aperture 18 and threadably receivable within the aperture is an extending screw member 20 for extending the element. The element has preferably a cut away portion 22 to facilitate the insertion of the screw and for its operation. The screw is provided with means such as staking the threads at 24 for limiting the inward movement of the screw and with the same means at 26 for limiting the outward movement of the screw. However, the screw may be provided with any other type means for limiting its movement.

Referring to FIGURES IV and VII the gripping element is provided with a dove-tail slot 28 for receiving a locking element for connecting the gripping element to a work element, such as a pulley. While the dove-tail slot is illustrated on the opposite side of the element from the slot in the element, it may be located at any position on the element where it would not interfere with the screw 20, or its operation. The member 30 in FIGURE VII is referred to as the locking element and its wider portion is provided with tapered edges 32 and 34 which are adapted to snugly fit into the dove-tail slot 28 of the gripping element. The locking element is adapted to be fixedly attached to the work element, as illustrated by the pulley 36. The pulley 36 is provided with a shoulder 38 and on the shoulder is a cut-away portion 40. The locking member 30 is provided with an extension 30' which is adapted to snugly fit into the cut-away portion 40. A screw 42 holds the locking element 30 in position on the pulley. After the locking element has been attached to the pulley and is slid into the dove-tail slot 28, the two are placed on the shaft, the gripping element and the work element being locked together and in operating position.

In FIGURES VIII to X there is illustrated a modified form of gripping element. For convenience this form of gripping element is designated by the numeral 50 and in most respects is substantially like the gripping element 10 shown and previously described. This gripping element 50 is provided with an extended portion 50' but otherwise it has the same structure as the gripping element 10 including the extending screw 20 and the faces 14 and 16. The extended portion 50' is in the form of an annular ring and is eccentric, or off center in respect to the central axis of the hole 12. The inner surface 52 of the extended portion 50' is tapered inwardly toward its outer side for engaging a corresponding tapered surface carried by the working element. The working element in this instance is shown as a bearing ring 60. The bearing ring is also provided with a projection 60' and is also provided with an outer surface that is parallel with the surface 52 on the extended member 50' carried on the gripping element. The extension 60' is also eccentric to the center axis of the bearing ring, and is adapted to slide within the opening of the extension 50' when the gripping element is expanded.

The gripping element is then rotated until it is in engagement with the ring portion 52, or the bearing ring is rotated until it comes into engagement with the extension 50' of the gripping element 50, after which the screw 20 is released allowing the gripping element to grip the shaft. Another method of locking the gripping element and the ring bearing 60 is to place them on the shaft in locking position, release the screw 20 allowing the gripping element to grip the shaft and permit the bearing ring 60 to creep around the shaft until they become locked by virtue of their eccentric engaging means.

In manufacturing the gripping element a piece of suitable steel stock is first bored slightly smaller than the shaft on which it is to be attached, that is, the size of the hole 12 is such that the ring must be extended by the screw 20 before it will slip over the shaft. The element is then split and the aperture is made adjacent and perpendicular to one of the faces as shown at 16. Next the aperture is threaded and the expanding screw 20 is inserted. The screw 20 is extended through the face 16 and in contact with the face 14 and continued to extend the diameter of the gripping element to its elastic limit.

After the element has been expanded the hole is rebored to round in order that it will more perfectly fit the shaft when released on the shaft. After the last operation the gripping element is ready to be slipped over a shaft.

While the gripping element is shown with a smooth bore, the bore may be threaded and used on a shaft as an adjustable collar against the shaft element of roller or ball bearing, as it may be used to lock the threaded sleeve which is used in adjusting the bearing elements.

If the gripping element is to be used to support a work element such as the pulley shown at 36 in FIGURE VI, it is provided with the dove-tail slot 28 of such dimensions as to snugly receive the attaching means, such as, the locking element 30. In this arrangement the locking element is first secured to the pulley 36 as previously described and the portion having the tapered faces 32 and 34 are then slid inwardly into the dove-tail slot 28 until the axis of the gripping element and the working element coincide after which they are slipped over the shaft 70 as a unit, after which the expanding screw 20 is retracted allowing the gripping element to engage the shaft.

If the modified form of the gripping ring as shown in FIGURES VIII to X is to be used, the extended gripping element and the bearing ring may be placed over the shaft separately, the portion 60' extending within the inner tapered surface of the portion 50' of the gripping member 50 and in position to engage the extended portion 60' of the bearing ring when the gripping element is in gripping engagement with the shaft. The respective eccentric projection on the gripping member and the bearing ring will engage to form an eccentric lock with each other when the gripping element is fixed to the shaft.

At the time the gripping element is manufactured it is desirable to expand the element in order that it may be immediately placed over the shaft, which only requires the retracting of the extending screw to enable the gripping element to engage the shaft.

By limiting the expansion of the gripping element by the limited movement of the screw 20 insures it from being extended beyond the elastic limits of the material from which the gripping element is made.

The gripping element has many uses, some of which have been mentioned, however this is not intended as a limitation on its use, either as a single element, or in combination with other elements.

The invention has thus been specifically described in detail embodying the features of the invention in its preferred form in order that the nature and operation of the same may be clearly understood; however, the specific terms herein are used descriptively and not in a limited sense, the scope of the invention being defined in the appended claim.

I claim:

A prestressed shaft gripping element comprising a heavy metallic ring having concentric outer circumference and a circular hole slightly smaller than the shaft over which it is intended to extend, the gripping element being formed with two abutting parallel faces, said faces being substantially parallel with a plane passing through the central rotating axis of the gripping element, a threaded aperture through one of the abutting faces perpendicular to the plane passing through the axis of the element, a screw for expanding the gripping element threadably receivable in said aperture, the inner end of the screw adapted to contact the opposite abutted face of the gripping element for expanding the gripping element to a size to extend over the said shaft, whereby the gripping element will grip the shaft when the expanding screw is retracted out of context with the opposite abutted face, an open sided dove-tail slot provided at one side and through the wall of the gripping element perpendicular to the rotating axis of the element for receiving a locking member for locking the element to a work element.

References Cited in the file of this patent
UNITED STATES PATENTS

| | | |
|---|---|---|
| 555,512 | Johnson | Mar. 3, 1896 |
| 669,927 | Hoffmann | Mar. 12, 1901 |
| 1,629,427 | Whitworth | May 17, 1927 |
| 2,040,152 | Pennington | May 12, 1936 |
| 2,081,677 | O'Neill | May 25, 1937 |
| 2,395,169 | Crane et al. | Feb. 19, 1946 |
| 2,827,925 | Meibaum | Mar. 25, 1958 |